United States Patent [19]

Ito et al.

[11] Patent Number: 5,047,939
[45] Date of Patent: Sep. 10, 1991

[54] REAR WHEEL STEERING ANGLE CONTROL SYSTEM FOR VEHICLE

[75] Inventors: Ken Ito; Kazutaka Adachi, both of Kanagawa, Japan

[73] Assignee: Nissan Motor Company, Limited, Japan

[21] Appl. No.: 407,463

[22] Filed: Sep. 7, 1989

[30] Foreign Application Priority Data

Sep. 8, 1988 [JP] Japan .................. 63-225825

[51] Int. Cl.$^5$ .................. B62D 7/14
[52] U.S. Cl. .................. 364/424.05; 280/91; 180/140; 180/142
[58] Field of Search .................. 364/424.05; 180/140-143; 280/91, 99

[56] References Cited

U.S. PATENT DOCUMENTS

| | | | |
|---|---|---|---|
| 4,657,102 | 4/1987 | Kanazawa et al. | 280/91 |
| 4,706,978 | 11/1987 | Ito | 280/91 |
| 4,720,790 | 1/1988 | Miki et al. | 364/424.05 |
| 4,778,023 | 10/1988 | Sugasawa | 280/91 |
| 4,926,954 | 5/1990 | Ataka et al. | 180/142 |

FOREIGN PATENT DOCUMENTS 62-6869(A) 1/1987 Japan .

*Primary Examiner*—Gary Chin
*Attorney, Agent, or Firm*—Lowe, Price, LeBlanc & Becker

[57] ABSTRACT

A rear wheel steering angle control system for a 4WS vehicle is provided. This system includes a first circuit for deriving a locus defined by a specific point provided on the front end of the vehicle, a second circuit for deriving a locus defined by a specific point provided on the rear end of the vehicle, a third circuit for providing a target steering angle for the rear wheels so that a rear corner does not overhang outwardly during turning, and a controller for controlling an actual angle for steering the rear wheels. The third circuit determines the target steering angle so as to restrict the magnitude of offset of the rear specific point from the locus of the front specific point. The controller steers the rear wheels by the target steering angle to restrict the magnitude of overhang of the rear end of the vehicle and enables the vehicle to turn within the minimum possible turning circle.

22 Claims, 13 Drawing Sheets

REAR WHEEL STEERING ANGLE CONTROL SYSTEM FOR VEHICLE

BACKGROUND OF THE INVENTION

1. Technical Field

The present invention relates generally to an apparatus for rotatably controlling the steering angle of the the rear wheels of a vehicle. More particularly, the invention relates to an apparatus for controlling the steering angle of the rear wheels of a vehicle without increasing the magnitude of overhang of the rear end thereof to improve turning properties so as to achieve the minimum possible turning circle at low vehicle speeds.

2 Background Art

It is well known in the art that extension of the wheel base of an automotive vehicle provides advantages such as improvement of steering stability, drive comfort, and increase space vehicle cabin.

Lengthwise extension of the wheel base however causes the turning properties to be impaired and thus requires a driver to make frequent 3 or 5 point turns instead of cornering in a single motion or making a simple U-turn. Additionally, there is a problem that the vehicle may come in contact with a wall for example due to the difference between turning circles of the inner front wheel and the inner rear wheel. Therefore the road width required for U-turns is increased.

For these reasons, it is difficult to design a vehicle having a relatively long wheel base in view of handling and cornering requirements. For example, in Japan, a car with 3000(cc) displacement has a wheel base of about 2.7(m) as against a car with 1000(cc) having a wheel base of about 2.3(m). It will be noted that the lengths of the wheel bases of both cars are not very different from each other compared with differences in displacement, type, and overall length.

Further, a so-called four wheel steering (4WS) vehicle is well known in the art wherein the provision of rear wheel steering in an opposite phase, or opposite angular direction relative to the steered angle of the front wheels improves the turning properties with respect to the possible minimum turning circle by reducing the turning circle and the difference between the turning circles of inner front and rear wheels. Such 4WS vehicles are already on the market However, in a conventional 4WS vehicle having a system for steering rear wheels in an opposite angular direction relative to the front wheel steering angle, the rear wheel steering angle is limited to a maximum of 5 degrees and the width between the rear wheels is substantially smaller than the overall vehicle width merely to restrict the magnitude of overhang of the rear end to be less than that of projections such as door mirrors. As the wheel base of a vehicle is increased the more pronounced the design limitations of the steering system become. For example, the turning radius of the front and rear wheels become increasingly different meaning body overhang with respect to wheel position must be increased making it difficult for a driver to accurately estimate vehicle body position during cornering, a situation which could lead to accidents. Therefore, the essential problem in previously proposed 4WS systems is that as steerability (i.e. turning circle) is improved, overhang of the rear end to compensate for the opposite phase rear wheel steering must be increased. This creates problems in cornering, handling and overall vehicle stability.

Therefore, in addition to limitations in modeling with respect to vehicle body, a vehicle having a relatively long wheel base cannot be provided with improved turning properties produced by four wheel steering for the reasons cited above.

SUMMARY OF THE INVENTION

It is accordingly an object of the present invention to provide an apparatus for rotatably controlling the steering angle of rear wheels which is applicable to a vehicle having a relatively long wheel base without reducing necessary turning properties.

According to one aspect of the present invention, there is provided an apparatus for controlling a rear wheel steering angle for a vehicle which comprises a first means for sensing vehicle speed to provide a signal indicative thereof, a second means for sensing an actual steered angle of a front wheel of the vehicle to provide a signal indicative thereof, a third means for deriving a first locus defined by a first specific point defined on the front end of the vehicle based on the signals from the first and the second means, a fourth means for determining a target steering angle for a rear wheel so as to restrict a second locus defined by a second specific point defined on the rear end of the vehicle from projecting outside of the first locus with respect to the center of the vehicle turning circle, and a fifth means for controlling an actual steering angle for the rear wheel based on the target steering angle to restrict the magnitude of overhang of the rear end of the vehicle during turning.

In the preferred mode, when the vehicle starts, the longitudinal center line between the first and the second specific points through the center of gravity of the vehicle is considered as part of said first locus.

A sixth means may be provided which determines a first steering angle for the rear wheel required for turning within a given target turning circle based on the signals output from the first and the second means and a second steering angle for the rear wheel requiring that the rear point intersects the first locus at a point at which a line drawn along the rear axle perpendicular to the longitudinal center line through the center of gravity of the vehicle would intersect the first locus. The fourth means determining which of the first and the second steering angles is smaller in absolute value and selecting same as the target steering angle when the phases of the actual steered angle and the second steering angle are different from each other and setting the target steering angle to zero when the phases of the actual steered angle and the second steering angle are the same.

BRIEF DESCRIPTION OF THE DRAWINGS

FIGS. 8 to 10a and 10b are flowcharts which show a sequence of logical operations for determining a rear wheel steering angle according to the invention.

DESCRIPTION OF THE PREFERRED EMBODIMENT

Figure 1:
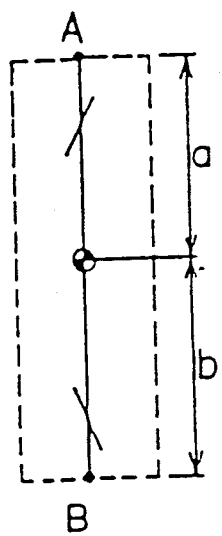
FIG. 1 is an explanatory view which shows a two wheeled vehicle.
Figure 2:
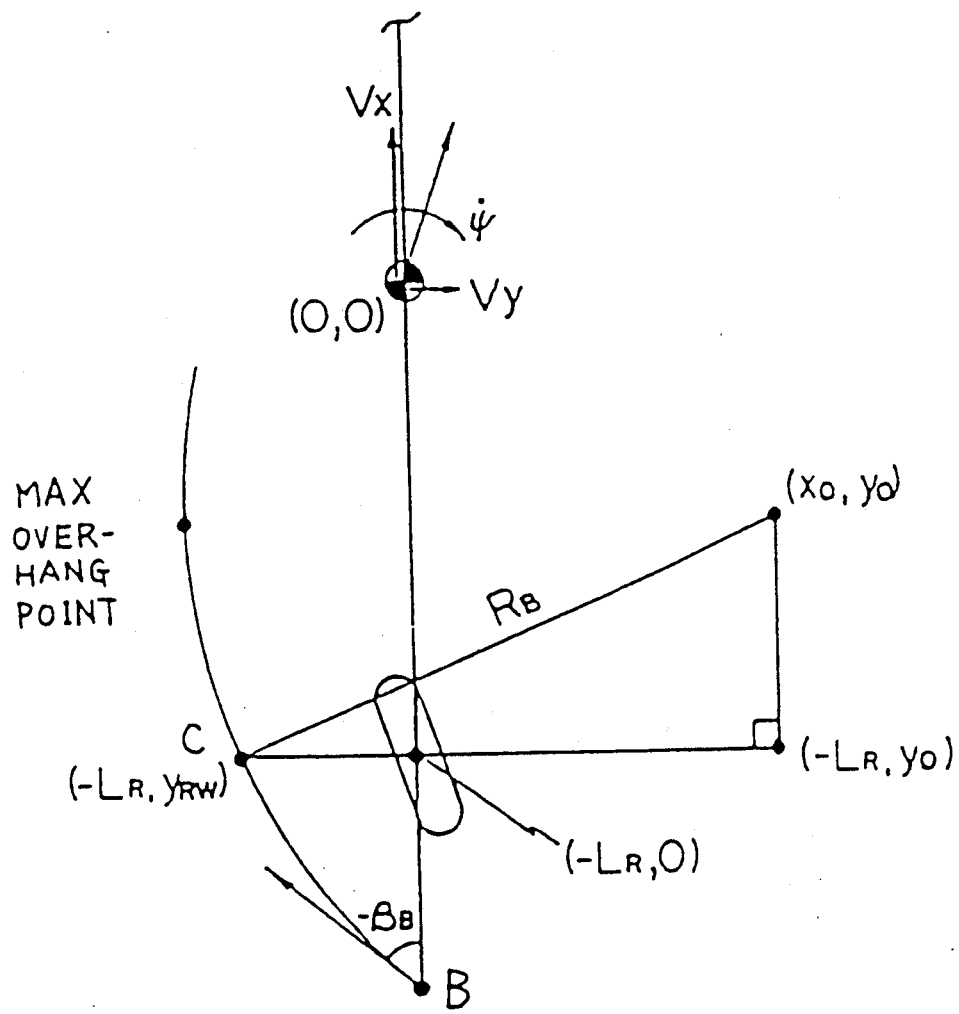
FIG. 2 is a view which shows a locus defined by a specific rear end point B of a vehicle in FIG. 1 during steady circle turning.

Referring now to the drawings, particularly to FIGS. 1 and 2, the fundamental formulas required for designing a rear wheel steering angle control system according to the invention will be first described hereinbelow.

For the sake of simplicity, the following representation is limited to a two-wheeled vehicle model. A front point A and a rear point B are defined at the centers of the front and the rear ends of the vehicle respectively. Turning conditions are considered as in steady circle turning wherein the turning circle is fixed and turning speed is constant since consideration of turning in low speed ranges need not note the dynamic characteristics of a vehicle.

If a front wheel steered angle $\theta$ and a rear wheel steered angle $\delta_R$ are provided, a yaw rate $\dot{\psi}$ and the lateral velocity of the center of gravity Vy are presented by the following equations in view of steady circle turning conditions based on linear analysis with approximately two degrees of freedom as is well known in the art.

$$\dot{\psi} = \frac{V}{(1 + AV^2)L} \left( \frac{\theta}{N} - \delta_R \right) \quad (1)$$

$$V_y = \frac{V}{(1 + AV^2)L} \left\{ \left( L_R - \frac{ML_F}{2K_RL} V^2 \right) \frac{\theta}{N} + \right.$$

-continued
$$\left. \left( L_F - \frac{ML_R}{2eK_FL} V^2 \right) \delta_R \right\} \quad (2)$$

where the V is a vehicle speed, the A is the stability factor 35 of a vehicle, the M is the mass of a vehicle, the $L_F$ is the distance between the front wheel and the center of gravity, the $L_R$ is the distance between the rear wheel and the center of gravity, L is the wheel base ($L = L_F + L_R$), $eK_F$ is equivalent to the cornering power of the front wheel, and $K_R$ is equivalent to the cornering power of the rear wheel.

FIG. 2 shows the locus of the rear point B during steady circle turning. The slip angle $\beta_B$ and radius $R_B$ are given by the following equations respectively.

$$\beta_B = \tan^{-1}\{(V_y - b\dot{\psi})/V_x\} \quad (3)$$

$$R_B = \{V_x^2 + (V_y - b\dot{\psi})^2\}^{\frac{1}{2}}/\dot{\psi} \quad (4)$$

The center point coordinates of the turning circle with respect to the vehicle system are defined by the following equations where the center of gravity coordinates are the origin (0, 0).

$$X_0 = -b - R_B\sin(-\beta_B) = -b - R_B\sin\beta_B \quad (5)$$
$$= -b - \frac{\sqrt{V_x^2 + (V_y - b\dot{\psi})^2}}{\dot{\psi}} \cdot \frac{(V_y - b\dot{\psi})}{\sqrt{V_x^2 + (V_y - b\dot{\psi})^2}} =$$
$$\frac{V_y}{\dot{\psi}}$$

$$Y_0 = R_B\cos(-\beta_B) = R_B\cos\beta_B \quad (6)$$
$$= \frac{\sqrt{V_x^2 + (V_y - b\dot{\psi})^2}}{\dot{\psi}} \cdot \frac{V_x}{\sqrt{V_x^2 + (V_y - b\dot{\psi})^2}} = \frac{V_x}{\dot{\psi}}$$

In view of cases where only the rear wheel is steered in an opposite phase relative to that of the front wheel, in other words, the rear wheel is steered in an angular direction opposite from that of the front wheel, the maximum overhang point of the rear point B shown in FIG. 2 is usually defined at the front of the x coordinate ($-L_R$) of the rear wheel axle. It will thus be appreciated that the design of a control system, according to the invention, preferably requires consideration of the magnitude of overhang of the rear point B with respect to the x coordinate of the rear axle, in other word, a Y coordinate ($y_{RW}$ to be described hereinafter in detail) of a point defined on the locus of the rear point B when a X coordinate thereof is assigned to the X coordinate of the rear wheel axle.

If the coordinates of a point are such that the rear point B passes the rear axle X coordinate after turning somewhat is $-L_R$, $Y_{RW}$, the following relation can be obtained using a triangle as represented in FIG. 2.

$$R_B^2 = (x_0 + L_R)^2 + (y_0 - Y_{RW})^2 \quad (7)$$

Figure 3:
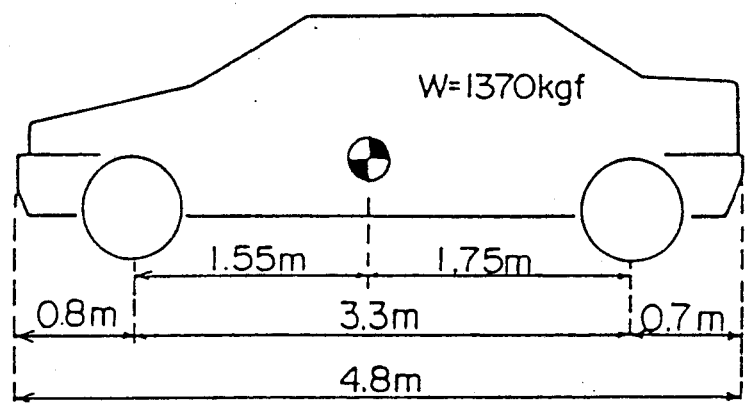
FIG. 3 is a schematic view which shows a vehicle having a relatively long wheel base controlled according to the invention.
Figure 4:
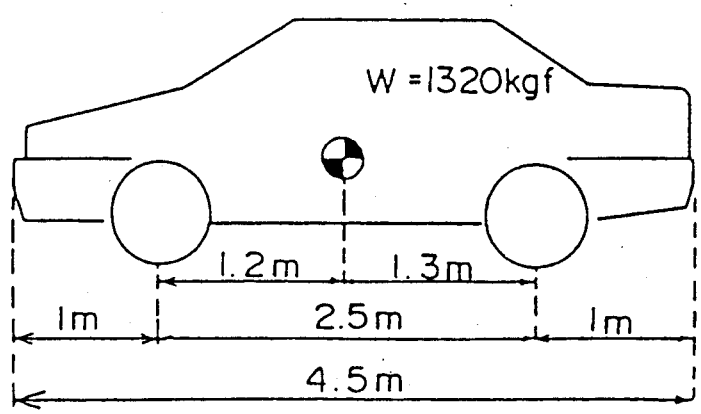
FIG. 4 is a schematic view which shows a vehicle having a relatively short wheel base as a control target.

Referring to FIGS. 3 and 4, an example of an automotive vehicle having a relatively long wheel base controlled according to the invention and an example of a model vehicle as a control target are shown.

The model vehicle is supposed as an automotive vehicle having an overall length of 4.5(m), a wheel base of 2.5(m), and a displacement of 1800(cc), while the control vehicle is supposed as a long wheel base vehicle having a wheel base of 3.3(m), 0.8(m) longer than that of the model vehicle and an overall length of 4.8(m) limited by shortening the front and rear overhangs.

Figure 5:
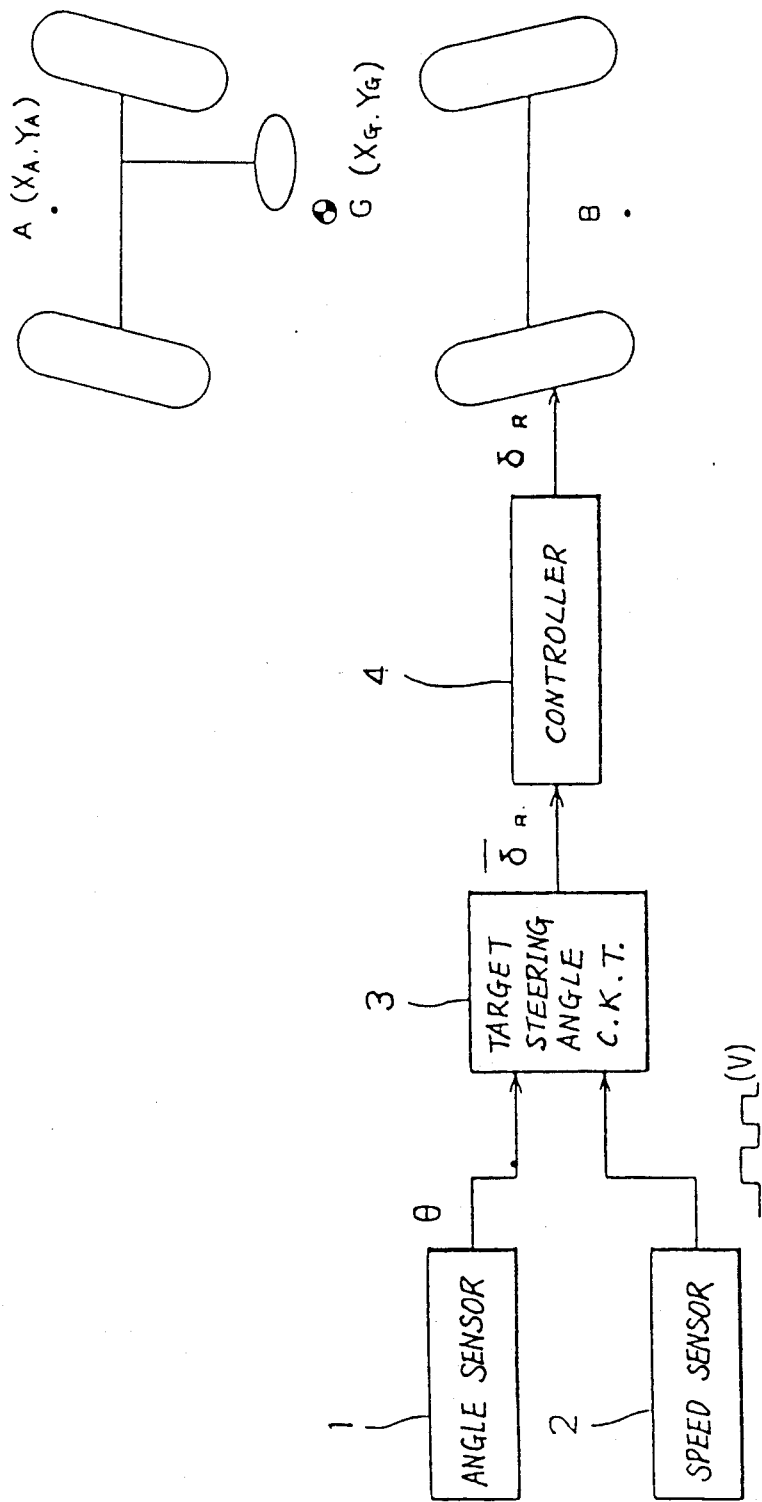
FIG. 5 is a schematic block diagram which shows a system for controlling a rear wheel steering angle according to the invention.

Referring to FIG. 5, there is illustrated an electrically controllable rear wheel rotary steering angle control system, according to the present invention, applicable to a so-called 4WS (four wheel steering) vehicle 5. This system includes generally a steered angle sensor 1, a wheel speed sensor 2, a steering target angle setting circuit 3, and a rear wheel steering angle controller 4. The steered angle sensor 1 is adapted for sensing a steered rotary angle $\theta$ of front wheels. The wheel speed sensor 2 outputs a pulse at every cycle of a predetermined distance $\Delta x$ to determine vehicle speed V. The target steering angle setting circuit 3 provides a target steering angle $\bar{\delta}_R$ for steering the rear wheels appropriately according to the invention. The steering angle controller 4 includes a system having a hydraulic actuator or so forth for variably controlling a rotary steering angle $\delta_R$ for rear wheels based on the target angle $\bar{\delta}_R$ provided by the circuit 3.

Figure 6:
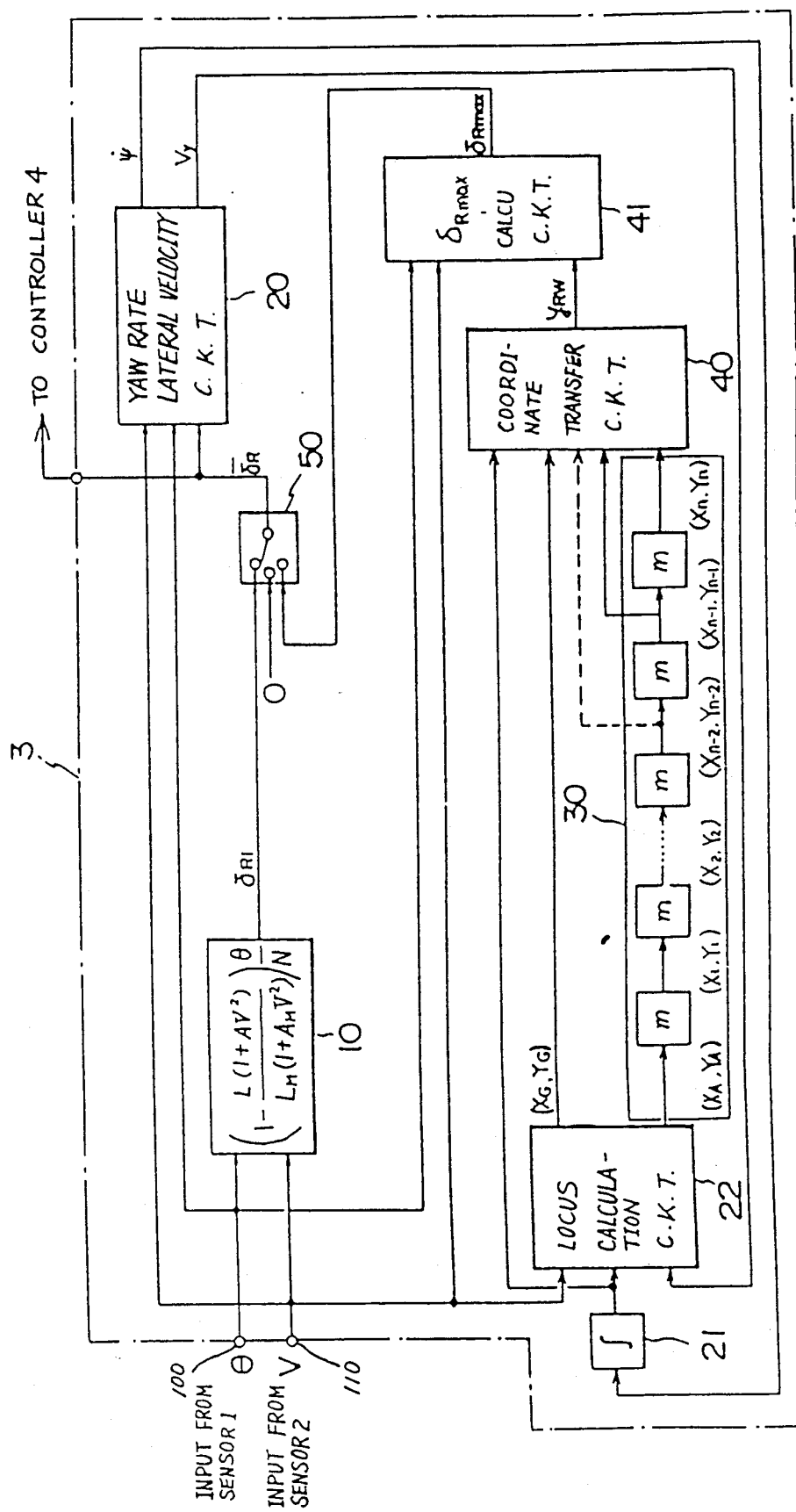
FIG. 6 is a block diagram which shows a system for determining a rear wheel steering angle according to the invention.

Referring to FIG. 6, the target steering angle setting circuit 3, according to the invention, is shown. This circuit generally comprises a main arithmetic circuit 10, a yaw rate-lateral velocity calculating circuit 20, a yaw angle estimating circuit 21, a coordinate calculating circuit 22, a front point locus memory circuit 30, a coordinate transformation rear point Y-coordinate calculating circuit 40, a rear wheel steering angle limit calculating circuit 41, and a rear wheel target steering angle selecting circuit 50.

The main arithmetic circuit 10 mathematically operates a rear wheel steering angle $\delta_{R1}$ required to turn a controlled vehicle with a turning circle equal to the model vehicle (this model vehicle is, as mentioned previously, a target vehicle for control and is shown in FIG. 4). The yaw rate-lateral velocity calculating circuit 20 estimatingly determines a yaw rate $\dot{\psi}$ and the lateral velocity Vy of the center of gravity G based on the steered angle $\theta$ input from the steered angle sensor 1 through signal input terminal 100, the vehicular speed V input from the wheel speed sensor 2 through an input terminal 110, and the rear wheel target steering angle $\bar{\delta}_R$ provided by the circuit 50. The yaw angle estimating circuit 21 integrates the yaw rate $\dot{\psi}$ estimated by the circuit 20 to estimate a yaw angle $\psi$. The coordinate calculating circuit 22 determines coordinates $(X_G, Y_G)$ of the center of gravity G and $(X_A, Y_A)$ of and the front point A with respect to the earth coordinate system based on the vehicle speed V, the estimated lateral velocity $V_y$, and the estimated yaw angle $\psi$. The front point locus memory circuit 30 includes memories for storing earth coordinate data of the front point A every running cycle of a predetermined distance $\Delta x$ and shifts the data accordingly (see FIG. 7). The coordinate transformation rear point Y coordinate calculating circuit 40 transforms locus data coordinates (Xi, Yi) of the front point A with respect to the earth coordinate system to locus data coordinates (xi, yi) of the vehicle coordinate system based on the center of gravity G coordinates $(X_G, Y_G)$ with respect to the earth system and the estimated yaw angle $\psi$ and then determines a Y coordinate $Y_{RW}$ of a point defined on the locus of the front point A where a X coordinate of the point is a X coordinate ($L_R$) of the rear axle. The rear wheel steering angle limit calculating circuit 41 determines a maximum steering angle $\delta_{Rmax}$ for the rear wheels based on the value $Y_{RW}$, the steered angle $\theta$, and the vehicle speed V. The rear wheel steering target angle selecting circuit 50 determines the target steering angle $\bar{\delta}_R$ for the rear wheels (e.i., appropriate steering angle for actually steering the rear wheels) based on the rear wheel steering angle $\delta_{R1}$ mathematically operated by the main arithmetic circuit 10 and the maximum steering angle $\delta_{Rmax}$ obtained by the rear wheel steering angle limit calculating circuit 41. The circuit 50 includes a selecting means for selecting the target steering angle among $\delta_{R1}$, $\delta_{Rmax}$, and zero, as will be described hereinafter, to provide a control signal indicative of the target steering angle to the rear wheel angle controller 4 through signal line 220 shown in FIG. 6.

Figure 8:
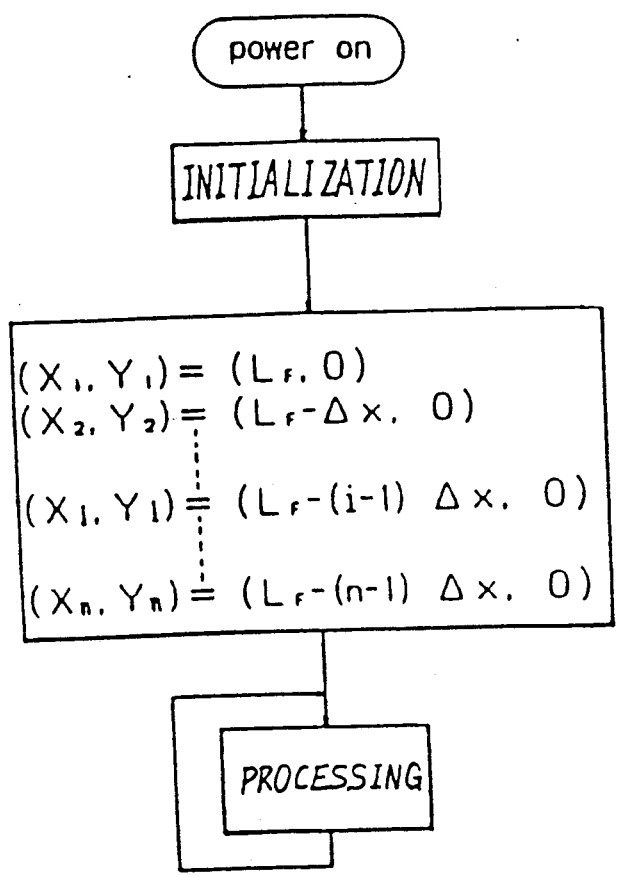

Operation will be described hereinbelow with reference to FIGS. 8 to 10, which show a sequence of logical steps carried out by the control system according to the invention. It is believed however, that by and large, the details of the flowcharts are self-explanatory in view of the use of standard symbols. Therefore, no attempt will be made here to describe them in detail.

The main arithmetic circuit determines the rear wheel steering angle $\delta_{R1}$ required for turning the controlled vehicle having a wheel base L and a stability factor A with a turning circle identical to that of the model vehicle having a wheel base $L_M$ and a stability factor $A_M$ and provides a signal indicative thereof to the circuit 50.

In this embodiment, the steering gear ratios (N) of the control vehicle and the model vehicle are the same. If the steered angle of the front wheels is a $\theta$ and the rear wheel steering angle is a $\delta_R$ (control vehicle only), turning circles R and $R_M$ of the control vehicle and the model vehicle are given as follows:

$$R = (1 + AV^2)L/(\theta/N - \delta_R) \tag{8}$$

$$R_M = (1 + A_M V^2)L_M/(\theta/N) \tag{9}$$

Thus, the rear wheel steering angle $\delta_{R1}$ required for satisfying the relation $R = R_M$ is obtained by the following equation using the above equations (8) and (9).

$$\delta_{R1} = K(V)\theta = \left(1 - \frac{L(1 + AV^2)}{L_M(1 + A_M V^2)}\right)\frac{\theta}{N} \tag{10}$$

If the $A_M$ is not equal to the A, a steering angle ratio between $\theta$ and $\theta R1$ is represented as a factor of the vehicle speed V. The K(v) is always negative (of opposite phase) relative the steered angle $\theta$ at a low speed (for example, 40 km/h or less).

The yaw rate-lateral velocity calculating circuit 20 is operable to estimate the yaw rate $\dot{\psi}$ and the lateral velocity Vy based on the above mentioned formulas (1) and (2) obtained according to approximate linear analysis and provides signals indicative thereof to the circuits 21 and 22. Calculation of the yaw rate $\dot{\psi}$ and the lateral velocity Vy in consideration of geometrical non-linearity of a vehicle can provide a high precision estimate.

The yaw angle estimating circuit 21 integrates the yaw rate $\dot{\psi}$ to obtain the yaw angle $\psi$ using the following equation.

$$\psi = \int \dot{\psi} dt$$

The coordinate calculating circuit 22 determines the coordinates $(X_G, Y_G)$ of the center of gravity with respect to the earth coordinate system based on the signal input from the circuit 20 using the following equations.

$$X_G = \int (Vx \cos\psi - Vy \sin\psi) dt \qquad (11)$$

$$Y_G = \int (Vx \sin\psi + vy \cos\psi) dt \qquad (12)$$

Additionally, on the basis of the coordinates ($X_G$, $Y_G$), the coordinates ($X_A$, $Y_A$) of the front point A with respect to the earth coordinate system are obtained as follows:

$$X_A = a \cos\psi + Y_G \qquad (13)$$

$$Y_A = a \sin\psi + Y_G \qquad (14)$$

Figure 9:
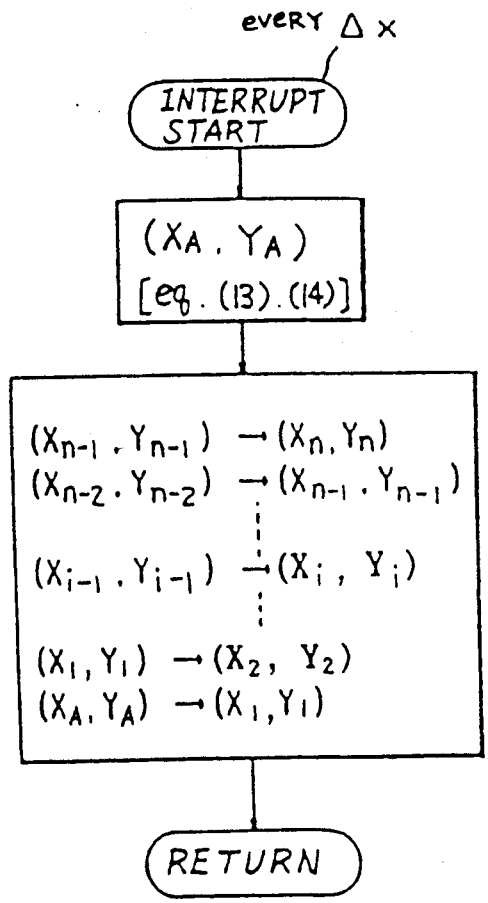

The coordinate calculating circuit 22 provides signals indicative of the front point earth coordinates ($X_A$, $Y_A$) to the circuit 30 every running of the predetermined distance $\Delta x$ (see FIG. 9).

When the above integrals are calculated by a digital computer for example, the above calculation can be simplified according to the following formula (Euler method)

$$Z(t) = Z(t - \Delta t) + \Delta t \dot{Z}(t - \Delta t)$$

where $\Delta t$ is a pitch time.

The front point locus memory circuit 30 stores the front point earth coordinates ($X_A$, $Y_A$) obtained by the circuit every running of the distance $\Delta x$ and shifts the data in sequence as is clear from the flowchart in FIG. 9.

The coordinate transformation-rear point Y coordinate calculating circuit 40 transforms, as described above, locus data coordinates ($X_i$, $Y_i$) of the front point A with respect to the earth coordinate system to locus data coordinates ($x_i$, $y_i$) with respect to the vehicle coordinate system based on signals output from the circuit 22, the circuit 21 and then determines a Y coordinate $Y_{RW}$ of a point defined on the locus of the front point A where an X coordinate of the point is an X coordinate ($L_R$) of the rear axle and provides a signal indicative thereof to the circuit 41.

However, when the controlled vehicle starts, the locus of the front point A does not exist between the front point A and the rear point B. Consequently, according to the operation shown in FIG. 8, the longitudinal center line through the center of gravity of the vehicle is assumed to be part of the locus defined by the front point A.

Figure 7:
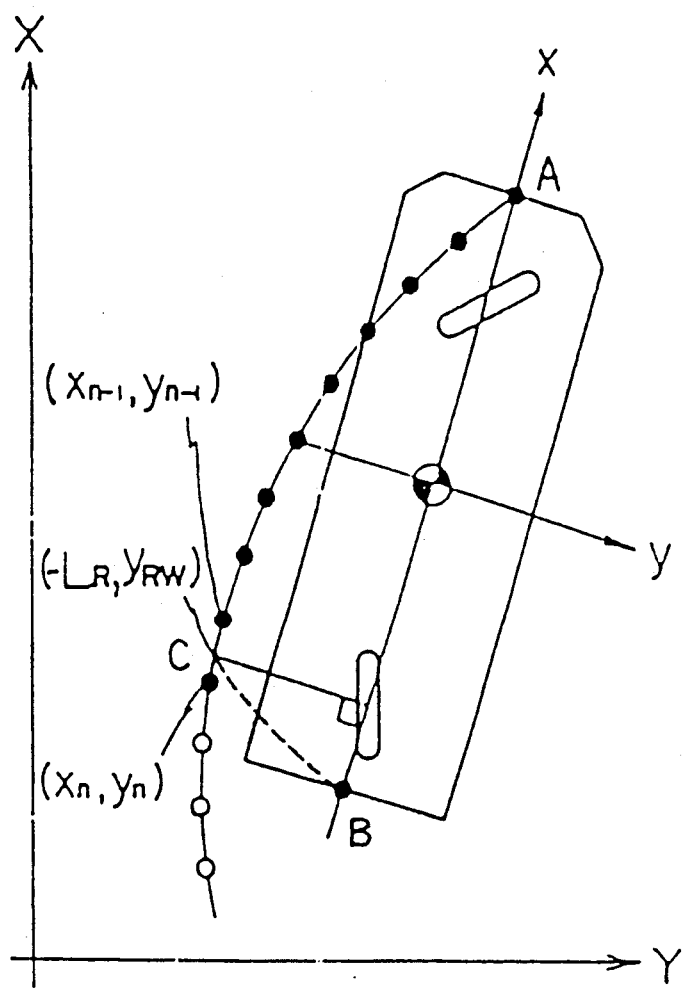
FIG. 7 is a view which shows coordinates of points on a locus defined by the specific front point A of a vehicle during turning.

With reference to FIG. 7, the calculation for obtaining $Y_{RW}$ will be described hereinbelow. Axes labeled "X" and "Y" define an earth coordinate system, while axes labeled "x", and "y" define a vehicle coordinate system with the origin fixed at the center of gravity of the vehicle.

Each point indicated by a black circle shows the front point A to be determined every running of the distance $\Delta x$, whose coordinate data ($X_i$, $Y_i$) with respect to the earth coordinate system is stored in the memory circuit 30. This data is transformed with respect to the vehicle coordinate system based on the following formulas.

$$x_i = (X_i - X_G)\cos\psi + (Y_i - Y_G)\sin\psi \qquad (15)$$

$$y_i = (Y_i - Y_G)\cos\psi - (X_i - X_G)\sin\psi \qquad (16)$$

Subsequently, The value of the $Y_{RW}$ is obtained based on the transformed front point locus data ($x_i$, $y_i$) with respect to the vehicle coordinate system. According to linear interpolation using coordinate data ($x_n$, $y_n$) and ($x_{n-1}$, $y_{n-1}$) of two points of the front point locus data which satisfy the relation of $x_n \leq (-L_R) < x_{n-1}$, the value of the $Y_{RW}$ is obtained as follows:

$$Y_{RW} = y_{n-1} - (x_{n-1} + L_R)\frac{(y_{n-1} - y_n)}{(x_{n-1} - x_n)} \qquad (17)$$

The rear wheel steering limiting angle calculating circuit 41 determines the allowable maximum rear wheel steering angle $\delta_{Rmax}$ based on the steered angle $\theta$, the vehicle speed V, and the value $Y_{RW}$ in the following manner and provides a signal indicative thereof to the circuit 50.

From the above formulas (4), (5), (6), and (7), $$(L_R - Vy/\dot\psi)^2 + (Vx/\dot\psi - Y_{RW})^2 = \{Vx^2 + (Vy - b\dot\psi)^2\}/\dot\psi^2 \qquad (18)$$

By multiplying both sides of the above equation by $\dot\psi$ and arranging it, the following equation is obtained.

$$(L_R^2 - b^2 + Y_{RW}^2)\dot\psi + 2(b - L_R)Vy = 2Y_{RW}Vx \qquad (19)$$

By substituting the equations (1) and (2) for the equation (19) and multiplying both sides of the equation by $(1 + AV^2)L/V$, the following equation is obtained.

$$(L_R^2 - b^2 + Y_{RW}^2)\left(\frac{\theta}{N} - \delta_R\right) + 2(b - L_R)\left\{(L_R - PV^2)\frac{\theta}{N} - (L_F - qV^2)\delta_R\right\} = 2(1 - AV^2)LY_{RW} \qquad (20)$$

where $P = ML_F/2K_RL$, $q = ML_R/2eK_FL$, $V_x = V$ (approximate value). Thus, if the $\theta$, the V, and the $Y_{RW}$ are provided, the $\delta_{Rmax}$ is obtained by the following formula.

$$\delta_{Rmax} = \frac{2(1 + AV^2)LY_{RW} - (Y_{RW}^2 - n_1V^2 - n_2)\theta/N}{(-Y_{RW}^2 - m_1V^2 + m_2)} \qquad (21)$$

where
the $m_1 = 2(b - L_R)q = ML_R(b - L_R)/eK_FL$, the $m_2 = 2(b - L_R)L_F + b^2 - L_R^2$, the $n_1 = 2(b - L_R)p = ML_F(b - L_R)/K_RL$, and the $n_2 = \{2(b - L_R)L_R + L_R^2 - b^2\} = (b - L_R)^2$ It will be noted that the $\delta_{Rmax}$ is a steering angle for steering the rear wheels so that the point C indicated in FIG. 2 which is defined by the locus of the rear point B meets with the locus defined by the front point A, as shown in FIG. 7.

Figure 10A:
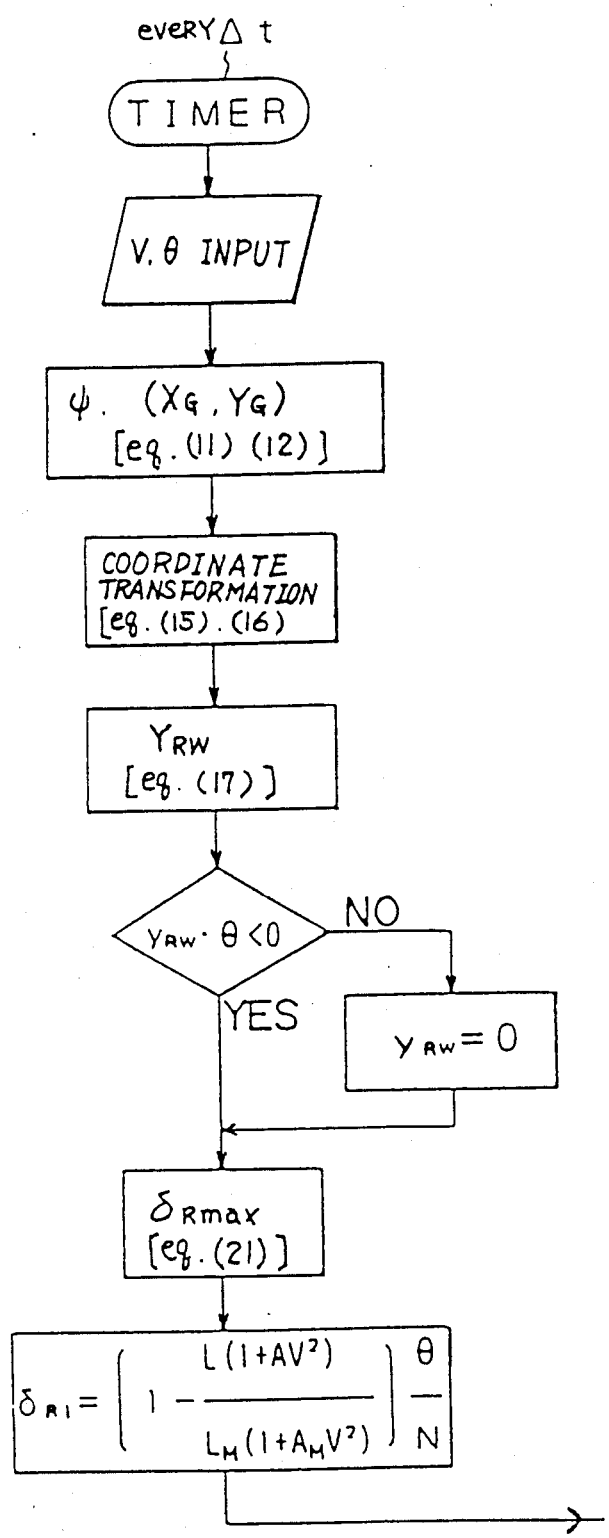
Figure 10B:
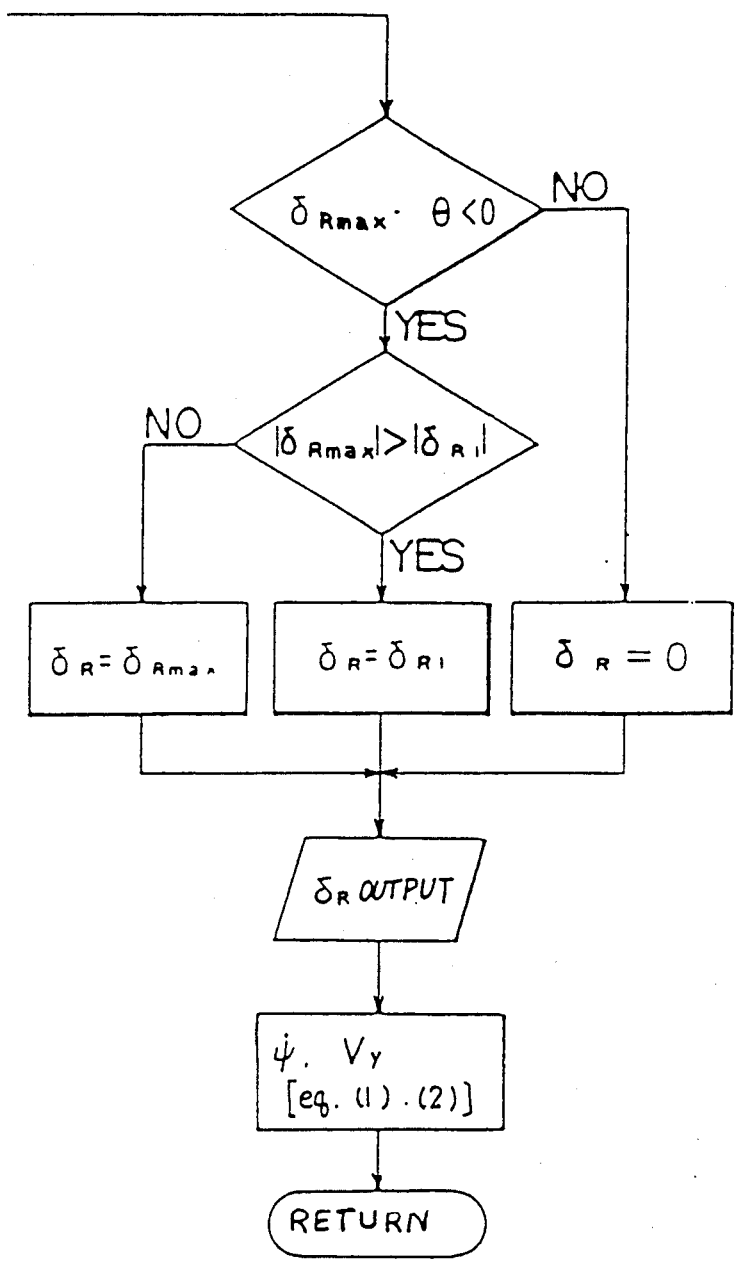

If the sign $(+, -)$ of the steered angle $\theta$ and the value $Y_{RW}$ are the same, the rear point B would tend to project outward from the locus defined by the front point A, the $Y_{RW} = 0$ is substituted into the above equation (21) to obtain $\delta_{Rmax}$ (indicated in a flowchart diagram in FIG. 10).

The rear wheel target steering angle calculating circuit 50 determines the rear wheel target steering angle $\delta_R$, in the following manner, based op the rear steering angle $\delta_{R1}$ calculated by the main arithmetic circuit 10 and the maximum rear wheel steering angle $\delta_{Rmax}$ obtained by the rear wheel steering angle limit calculating circuit 41.

First, if the signs of the steering angle $\theta$ and the maximum allowable rear wheel steering angle $\theta_{Rmax}$ are the same (e.i., if the signs of $\delta_{R1}$ and $\delta_{Rmax}$ are opposite each other since the signs of $\delta_{R1}$ and $\theta$ are opposite each other as described above), in other words, rear steering in the same angular direction as the front wheel steering is required (see the right-hand portion of FIG. 10), $\bar{\delta}_R$ is defined as zero since the control system according to the invention is applied to opposite phase steering at low speeds.

On the other hand, if the signs of the steering angle $\theta$ and the maximum allowable rear wheel steering angle $\delta_{Rmax}$ are different from each other (e.i., when the signs of the $\delta_{R1}$ and the $\delta_{Rmax}$ are the same), the absolute value of $\delta_{R1}$ is compared with that of $\delta_{Rmax}$ and the value having the smaller absolute value is assigned to the rear wheel target steering value $\bar{\delta}_R$. This selection is executed by a switching means provided in the circuit 50.

In the above described embodiment, the vehicle speed V can be obtained by detecting pulses generated every running of the predetermined distance $\Delta x$. Alternatively, a speedometer, such as an optical speedometer, for measuring vehicular speed directly relative to the earth can be provided.

As described above, the control system of this embodiment is adapted for steering in the opposite angular direction (opposite phase) relative to the steered angular direction of the front wheels or not (e.i., the target rear steering angle is set to zero), therefore, as mentioned hereinafter, such steering control causes the rear point to project slightly by a magnitude similar to a 2WS vehicle when it begins turning via the steering wheel because the longitudinal center line through the center of gravity is assumed to be the locus defined by the front point A, as mentioned previously, and the target rear steering angle is set to zero when the control vehicle starts. However, in addition to the opposite phase steering system, a same phase steering system is provided. Further, the provision of control wherein $\delta_{Rmax}$ is assigned to the target rear wheel steering angle $\bar{\delta}_R$ when the signs of $\theta$ and $\delta_{Rmax}$ are the same causes the magnitude of projection of the rear point to be further reduced.

Figure 11:
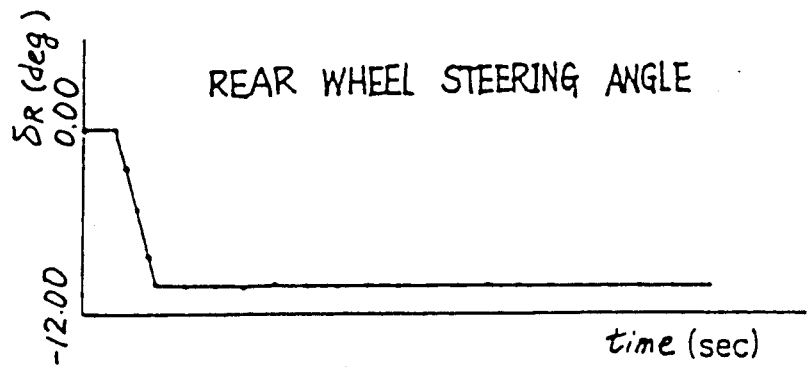
FIG. 11 is a graph which shows variation of a rear wheel steering angle with respect to time according to the invention.
Figure 12:
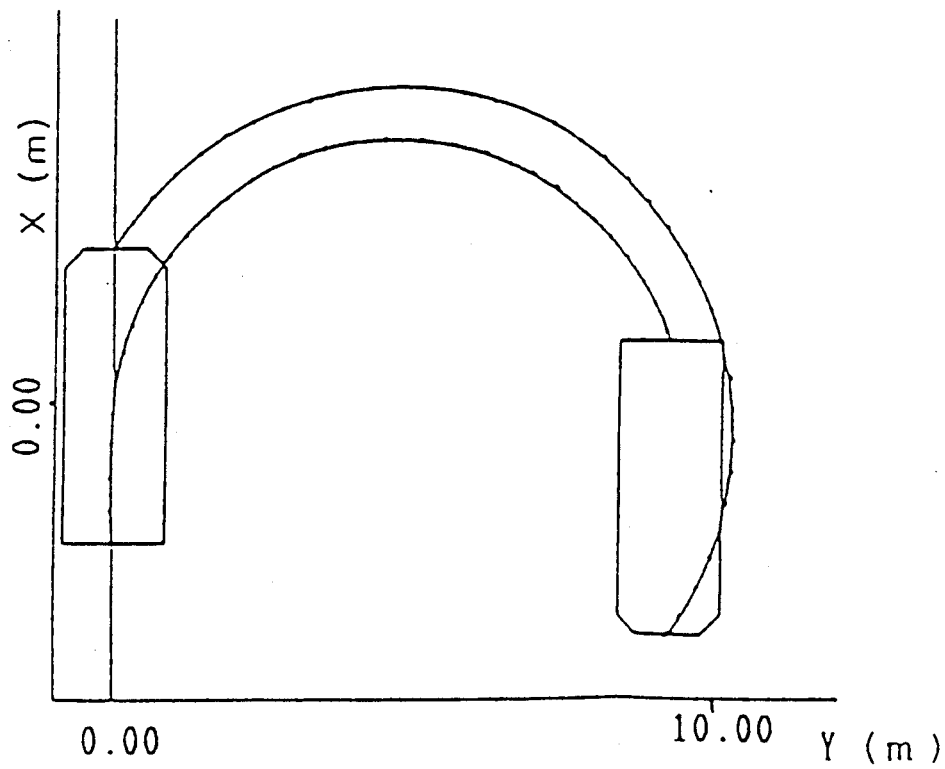
FIG. 12 is a graph which shows locuses defined by the front point A and the rear point B during turning according to a rear wheel steering angle indicated in FIG. 11.
Figure 13:
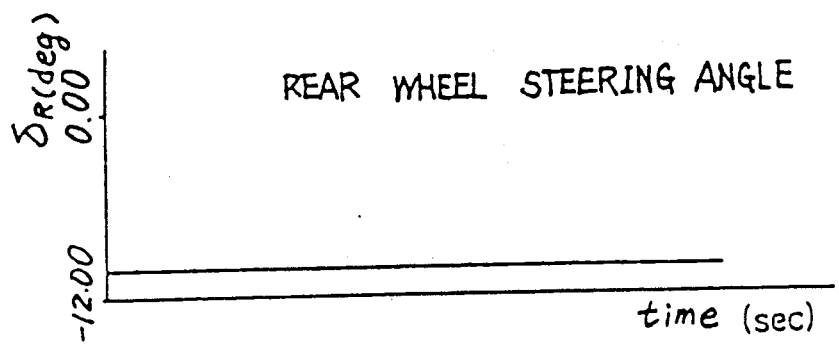
FIG. 13 is a graph which shows a rear wheel steering angle with respect to time according to a conventional control system.
Figure 14:
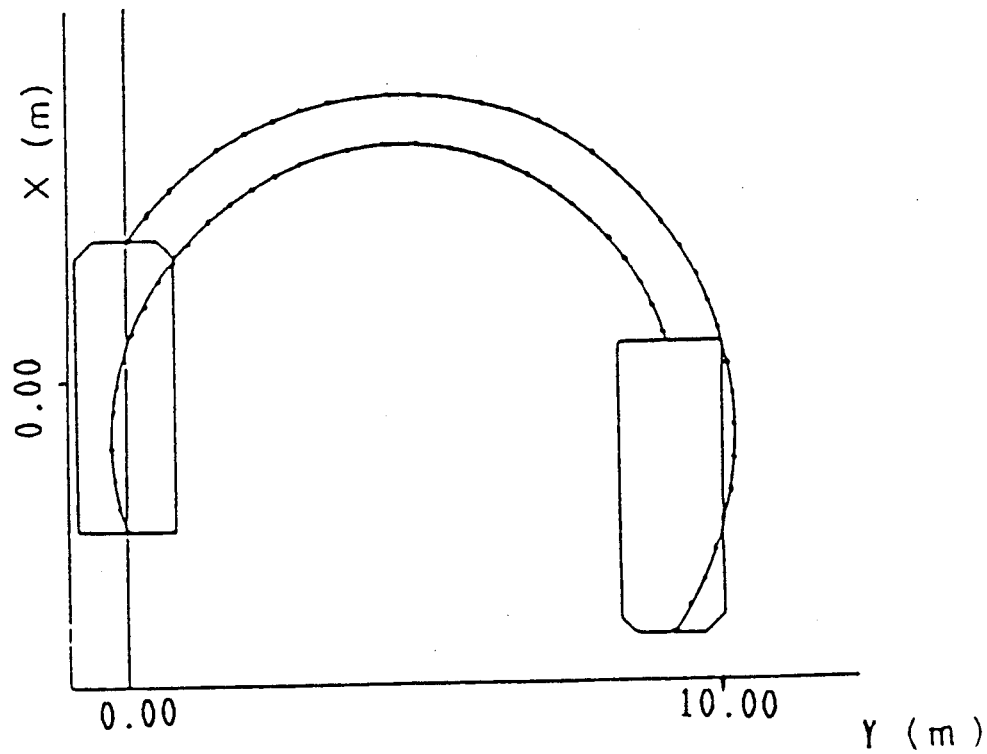
FIG. 14 is a graph which shows locuses defined by the front point A and the rear point B during turning according to a rear wheel steering angle indicated in FIG. 14.

FIGS. 11 and 12 show a simulation of vehicle turning controlled according to the invention when it is turned 180 degrees at the maximum steering angle of the front wheels, while FIGS. 13 and 14 show a simulation of vehicle turning controlled according to a conventional four wheel steering system for controlling the rear wheels to be steered by $\delta_{R1}$ calculated by the main arithmetic circuit 10 for example. In these two simulations, the control vehicle shown and the model vehicle are the vehicles shown in FIGS. 5 and 6 respectively. The stability factors of the control and model vehicles are as follows:

$A = 1.123 \times 10^{-3} \, (s^2/m^2)$ $A_M = 1.401 \times 10^{-3} \, (s^2/m^2)$ The steering gear ratios N of both vehicles are 17. Moreover, the front wheel steered angles $\theta$ are supposed to be steered fully ($\theta = 540$ degrees). The vehicle speeds v are constant speeds of 1 (km/h).

Figure 16:
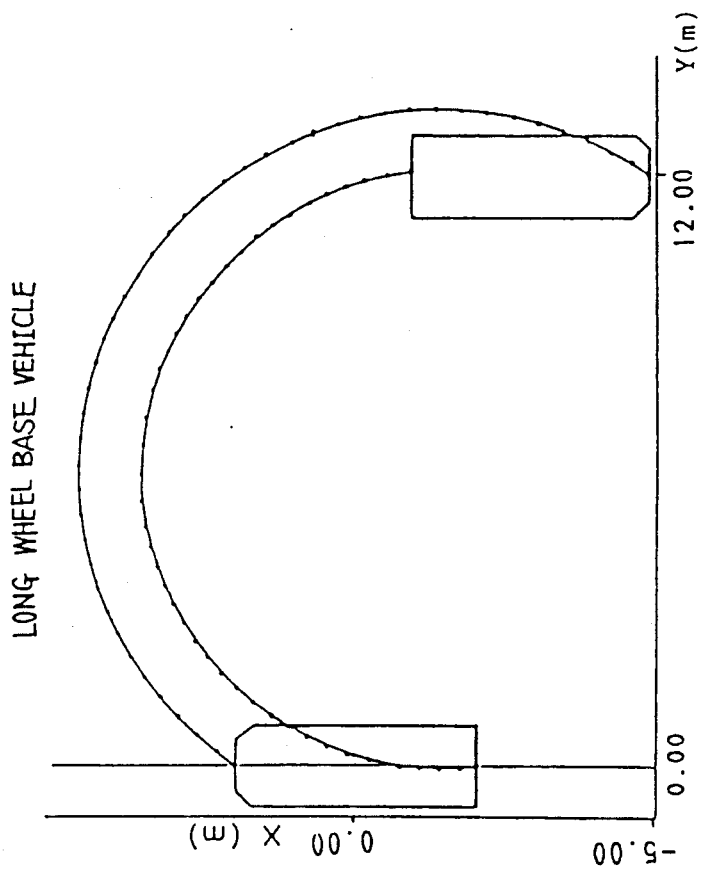
FIG. 16 is a view which shows locuses defined by the front and the rear points A and B of a vehicle having a relatively long wheel base as shown in FIG. 3 during a turn steered with front wheels only.
Figure 15:
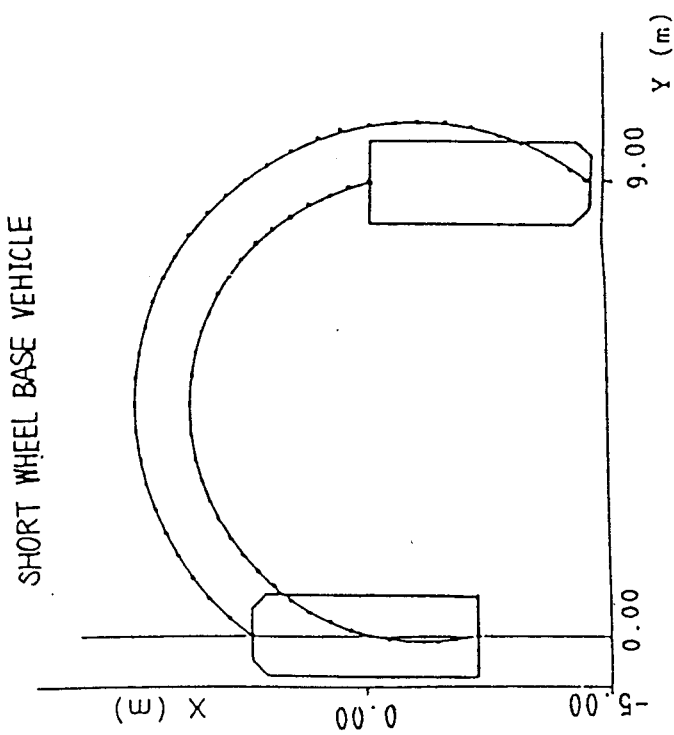
FIG. 15 is a view which shows locuses defined by the front and the rear points A and B of a vehicle having a relatively short wheel base as shown in FIG. 4 during turning with only steered front wheels.

FIGS. 15 shows locuses of the front and the rear points A and B of the model vehicle as shown in FIG. 4, which are defined by turning with the steered front wheels (the rear wheel steering angle $\delta_R = 0$). Similarly, FIG. 16 shows locuses of the front and the rear points A and B of the vehicle as shown in FIG. 3 turned by steering the front wheels only.

The magnitude of overhang of the rear point B and the road width required for U turns when the vehicles shown in FIGS. 12, 14, 15, and 16 are turned by 180 degrees will be shown in the following table.

TABLE

| type | long wheel base vehicle | | | short wheel base vehicle |
|---|---|---|---|---|
| control | invention | conventional | 2WS | 2WS |
| overhang | 4.7 cm | 24.3 cm | 4.1 cm | 11.0 cm |
| road width for U-turn | 10.34 m + overall width | 10.34 m + overall width | 13.22 m + overall width | 10.33 m + overall width |

The above table shows that a U turn by the vehicle having a long wheel base according to 2WS (two wheel steering) requires a wider road width compared with the model vehicle having a short wheel base. The vehicle having a long wheel base controlled according to the conventional 4WS (the opposite phase proportional control) needs a road width substantially equal to that required for a U turn of the model vehicle. The magnitude of overhang however increases extremely, increasing the danger of contact of the rear end with a wall, a guardrail, or so forth under urban driving conditions. On the other hand, the road width required for U turns by a vehicle controlled according to the invention is substantially equal to that required by the model vehicle or the vehicle controlled by the conventional 4WS but the magnitude of overhang of the rear end can be restricted to almost the same value as the 2WS vehicle.

The reason for reduction in the magnitude of rear end overhang in the vehicle controlled according to the invention and the 2WS compared to the model vehicle (2WS) is that the wheel base of the controlled vehicle is extended so rear overhang is shortened to 0.7(m) relative the rear overhang 1(m) of the model vehicle.

The rear wheel steering angle control system according to the invention, as mentioned previously, is adapted for restricting the magnitude of the steering angle for rear wheels when a specific rear point defined at the center of the rear end would tend to project outside of a locus defined by the specific front point during turning. Therefore, the control system of the invention can accomplish great reduction of the turning circle without increasing the magnitude of projection of the rear end (for example, a corner of the rear end of the vehicle body). It will be realized that a long wheel base automotive vehicle which has optimum maneuverability and turnability within the minimum possible turning circle can be provided. As a result, increase in vehicular cabin space and improvement of steering stability and driving comfort can be obtained. Additionally, it is possible that a driver may drive as he would in a 2WS type vehicle even at low speeds without having to pay particular attention to overhang of the rear end of the vehicle. Further, the degree of freedom of design is increased with possibilities for styling a car having a new image different from conventional car styling. This results in greatly improved commercial value.

What is claimed is:

1. An apparatus for controlling a rear wheel steering angle of a vehicle comprising:
   first means for sensing vehicle speed to provide a signal indicative thereof;
   second means for sensing an actual steered angle of a front wheel of the vehicle to provide a signal indicative thereof;
   third means for deriving a first locus defined along a path of a first specific point on the front end of the vehicle based on the signals from said first and second means;
   fourth means for determining a target steering angle for a rear wheel based on parameters associated with the vehicle speed and the actual steered angle of the front wheel sensed by said first and second means such that a second locus extending along a path of a second specific point on the rear end of the vehicle is defined within said first locus with respect to the center of the vehicle turning circle; and
   fifth means for controlling the rear wheel actual steering angle based on said target steering angle to restrict the amount of overhand of the rear end of the vehicle during turning.

2. An apparatus as set forth in claim 2, wherein a longitudinal line between said first and second specific points at the time the vehicle starts lies along said first locus.

3. An apparatus as set forth in claim 1, further comprising sixth means for determining (a) a first steering angle for the rear wheel required for turning within a given target turning circle based on the signals from said first and said second means and (b) a second steering angle for the rear wheel requiring the second specific point to intersect said first locus at a point where a line extending along the rear axle perpendicular to a longitudinal line extending between the first and second specific points intersects said first locus, said fourth means determining the smaller of the absolute values of said first and said second steering angles and selecting the smaller steering angle as the target steering angle in response to the values of said actual steered angle and the second steering angle differing from each other and setting said target steering angle to zero in response to the values of said actual steered angle and the second steering angle being the same.

4. An apparatus as set forth in claim 2, further comprising sixth means for determining (a) a first steering angle for the rear wheel required for turning within a given target turning circle based on the signals from said first and second means and (b) a second steering angle for the rear wheel requiring the second specific point to intersect said first locus at a point where a line extending along the rear axle perpendicular to a longitudinal line extending between the first and second specific points intersects said first locus, said fourth means determining the smaller of the absolute values of said first and said second steering angles and selecting the smaller steering angle as the target steering angle in response to the values of said actual steered angle and the second steering angle differing from each other and setting said target steering angle to zero in response to the values of said actual steered angle and the second steering angle being the same.

5. An apparatus as set forth in claim 1, wherein said third means; (a) estimates yaw rate and lateral velocity of the center of gravity of the vehicle based on the signals from said first and second means, (b) estimates a yaw angle based on said estimated yaw rate, (c) determines coordinates of the vehicle center of gravity with respect to an earth coordinate system based on (i) said vehicle speed, (ii) said estimated lateral velocity and (iii) said estimated yaw angle, and (d) determines coordinates of said first specific point based on said estimated yaw angle and said coordinates of the center of gravity to derive said first locus.

6. An apparatus as set forth in claim 5, wherein said third means includes memory means for (a) updating said coordinates each time the vehicle traverses a predetermine distance and (c) calculating said first locus based on the stored coordinates.

7. An apparatus as set forth in claim 1, wherein said third means determines coordinates of the center of gravity with respect to the earth coordinate system, determining coordinates of said first specific point with respect to the earth coordinate system based on the determined coordinates of the center of gravity, and determining the coordinates of said first specific point with respect to a vehicle coordinate system based on the determined coordinates thereof with respect to the earth coordinate system to derive said first locus.

8. Apparatus for controlling a rear wheel steering angle of a vehicle comprising:
   first means for sensing vehicle speed to provide a signal indicative thereof;
   second means for sensing an actual steered angle of a front wheel of the vehicle to provide a signal indicative thereof;
   third means for determining a first rear wheel steering angle required for turning within a given target turning circle based on the signals from said first and second means and providing a signal indicative thereof;
   fourth means for deriving a first locus defined along a path of a first specific point on the front end of the vehicle based on the signals from said first and said second means;
   fifth means for determining a second rear wheel steering angle so that a second specific point defined on the rear end of the vehicle coincides with the first locus to provide a signal indicative thereof;
   sixth means for selecting the smaller of the absolute value of the first and second rear wheel steering angles to provide a rear wheel target steering angle so that a second locus, defined by the path of the second specific point, is positioned inside the first locus with respect to the center of a vehicle turning circle; and
   seventh means for controlling an actual steering angle for the rear wheel based on said rear wheel target steering angle.

9. An apparatus as set forth in claim 8, wherein a longitudinal line between said first and said second specific points at the time the vehicle starts is part of said first locus.

10. An apparatus as set forth in claim 8, wherein said fifth means determines the second rear wheel steering angle for the rear wheel to cause the second specific point to intersect said first locus at a point where a line extending along the vehicle rear axle perpendicular to a longitudinal line extending between the first and second specific points intersects said first locus, said sixth means selecting the smaller of the absolute value of the first and second rear wheel steering angles in response to the values of said actual steered angle and the second rear wheel steering angle differing from each other and setting said target steering angle to zero in response to the values of said actual steered angle and the second rear wheel steering angle being the same.

11. An apparatus as set forth in claim 9, wherein said fifth means determines the second rear wheel steering angle for the rear wheel to cause the second specific point to intersect said first locus at a point where a line extending along the vehicle rear axle perpendicular to the longitudinal line extending between the first and second specific points intersects said first locus, said sixth means selecting the smaller of the absolute values of the first and second rear wheel steering angles in response to the values of said actual steered angle and the second rear wheel steering angle differing from each other and setting said target steering angle to zero in response to the values of said actual steered angle and the second rear wheel steering angle being the same.

12. An apparatus as set forth in claim 8, wherein said fourth means: (a) estimates yaw rate and lateral velocity of the center of gravity of the vehicle based on the signals from said first and said second means, (b) estimates a yaw angle based on said estimated yaw rate, (c) determines coordinates of the vehicle center of gravity with respect to an earth coordinate system based on (i) said vehicle speed, (ii) said estimated lateral velocity and (iii) said estimated yaw angle, and (d) determines coordinates of said first specific point based on said estimated yaw angle and said coordinates of the center of gravity to derive said first locus.

13. An apparatus as set forth in claim 12, wherein said fourth means includes memory means for (a) updating said coordinates of said first specific point, (b) stores the updated coordinates each time the vehicle traverses a predetermined distance and (c) calculating said first locus based on the stored coordinates.

14. An apparatus as set forth in claim 8, wherein said fourth means: (a) determines coordinates of the center of gravity with respect to the earth coordinate system, (b) determines coordinates of said first specific point with respect to the earth coordinate system based on the determined coordinates of the vehicle center of gravity, and (c) determines the coordinates of said first specific point with respect to a vehicle coordinate system based on the determined coordinates thereof with respect to the earth coordinate system to derive said first locus.

15. A system for controlling a rear wheel steering angle for a vehicle comprising:
first means for sensing vehicle speed to provide a signal indicative thereof;
second means for sensing an actual steered angle of front wheels of the vehicle to provide a signal indicative thereof;
third means for determining a first rear wheel steering angle required for turning within a given target turning circle as a function of the vehicle speed and the actual steered angle of the front wheel sensed by said first and second means and providing a signal indicative thereof;
fourth means for providing a first locus defined along a path of a first specific point on the front end of the vehicle based on the signals from, the first locus including a longitudinal line extending between the first specific point and a second specific point on the rear end of the vehicle as part of the first locus at the time the system starts;
fifth means for determining a second rear wheel steering angle resulting in the second specific point intersecting the first locus at a point where a line extending between center points of the rear wheels intersects the first locus and providing a signal indicative thereof;
sixth means for selecting the smaller of the absolute values of the first and second rear wheel steering angles to provide a rear wheel target steering angle to cause the second locus to be positioned inside the first locus with respect to the center of the vehicle turning circle; and
seventh means for controlling the rear wheel actual steering angle based on said rear wheel target steering angle.

16. A system as set forth in claim 15, wherein said sixth means selects (a) the smaller of the absolute value of the first and second rear wheel steering angles in response to the values of said actual steered angle and the second rear wheel steering angle differing from each other and (b) sets said target steering angle to zero in response to the values of said actual steered angle and the second rear wheel steering angle being the same.

17. A system as set forth in claim 15, wherein said fourth means (a) estimates yaw rate and lateral velocity of the vehicle center of gravity based on the signals from said first and said second means, (b) estimates a yaw angle based on said estimated yaw rate, (c) determines coordinates of the vehicle center of gravity with respect to an earth coordinate system based on (i) said vehicle speed, (ii) said estimated lateral velocity, and (iii) said estimated yaw angle, and (d) determines coordinates of said first specific point based on said estimated yaw angle and said coordinates of the center of gravity to derive said first locus.

18. A system as set forth in claim 17, wherein said fourth means includes memory means for (a) updating said coordinates of said first specific point and (b) storing the updated coordinates each time the vehicle traverses a predetermined distance by the vehicle and (c) calculating said first locus based on the stored coordinates.

19. A system as set forth in claim 15, wherein said fourth means (a) determines coordinates of the center of gravity with respect to the earth coordinate system, (b) determines coordinates of said first specific point with respect to the earth coordinate system based on the determined coordinates of the center of gravity, and (c) determines the coordinate system based on the determined coordinates thereof with respect to the earth coordinate system to derive said first locus.

20. Apparatus for controlling a rear wheel steering angle of a vehicle in response to first and second signals respectively indicative of sensed vehicle speed and an actual steered angle of a front wheel of the vehicle comprising
means responsive to the first and second signals for:
(a) deriving a first locus extending along a path defined by a first specific point on the front end of the vehicle based on parameters associated with the vehicle speed and the actual steered angle of the front wheel,
(b) determining a target steering angle for a rear wheel based on parameters associated with the vehicle speed and the actual steered angle of the front wheel such that a second locus extending along a path of a second specific point on the rear end of the vehicle is defined within said first locus with respect to the center of the vehicle turning circle, and (c) deriving a control signal for the rear wheel actual steering angle base on said target steering angle to restrict the amount of overhand to the rear end of the vehicle during turning; and means for supplying the control signal to a mechanism for controlling the rear wheel steering angle.

21. Apparatus for controlling a rear wheel steering angle of a vehicle in response to first and second signals respectively indicative of sensed vehicle speed and an actual steered angle of a front wheel of the vehicle comprising .

means responsive to the first and second signals for:
(a) determining a first rear wheel steering angle required for turning within a given target turning circle based on parameters associated with the vehicle speed and the actual steered angle of the front wheel and deriving a signal indicative thereof,
(b) deriving a first locus defined along a path of a first specific point on the front end of the vehicle based on parameters associated with the vehicle speed and the actual steered angle of the front wheel,
(c) determining a second rear wheel steering angle so that a second specific point defined on the rear end of the vehicle coincides with the first locus,
(d) selecting the smaller of the absolute values of the first and second rear wheel steering angles to provide a rear wheel target steering angle so that a second locus, defined by the path of the second specific point, is positioned inside the first locus with respect to the center of a vehicle turning circle, and
(e) deriving a control signal for an actual steering angle for the rear wheel based on said rear wheel target steering angle; and means for supplying the control signal to a mechanism for controlling the rear wheel steering angle.

22. Apparatus for controlling a rear wheel steering angle of a vehicle in response to first and second signals respectively indicative of sensed vehicle speed and an actual steering angle of a front wheel of the vehicle comprising:

means responsive to the first and second signals for:
(a) determining a first rear wheel steering angle required for turning within a given target turning circle as a function of the vehicle speed and the actual steered angle of the front wheel,
(b) determining a first locus as along a path of a first specific point on to the front end of the vehicle based on parameters associated with the vehicle speed and the actual steered angle of the front wheel, the first locus including a longitudinal line extending between the first specific point and a second specific point on the rear end of the vehicle as part of the first locus at the time the system starts,
(c) determining a second rear wheel steering angle resulting in the second specific point intersecting the first locus at a point where a line extending between center points of the rear wheels intersects the first locus and providing a signal indicative thereof,
(d) selecting the smaller of the absolute values of the first and second rear wheel steering angles and to provide a rear wheel target steering angle to cause the second locus to be positioned inside the first locus with respect to the center of the vehicle turning circle,
(e) deriving a control signal for an actual steering angle for the rear wheel based on said rear wheel target steering angle, and means for supplying the control signal to a mechanism for controlling the rear wheel steering angle.

* * * * *